United States Patent
Ye et al.

(10) Patent No.: US 12,327,407 B2
(45) Date of Patent: Jun. 10, 2025

(54) ROAD NETWORK EXTRACTION METHOD, DEVICE, AND STORAGE MEDIUM

(71) Applicant: Beijing Baidu Netcom Science Technology Co., Ltd., Beijing (CN)

(72) Inventors: Xiaoqing Ye, Beijing (CN); Deguo Xia, Beijing (CN); Jizhou Huang, Beijing (CN); Haifeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 340 days.

(21) Appl. No.: 18/152,119

(22) Filed: Jan. 9, 2023

(65) Prior Publication Data

US 2023/0368523 A1     Nov. 16, 2023

(30) Foreign Application Priority Data

May 16, 2022   (CN) .......................... 202210530008.3

(51) Int. Cl.
*G06V 20/10* (2022.01)
*G01C 21/00* (2006.01)
(Continued)

(52) U.S. Cl.
CPC ....... *G06V 20/182* (2022.01); *G01C 21/3819* (2020.08); *G01C 21/3852* (2020.08);
(Continued)

(58) Field of Classification Search
CPC .. G06V 20/182; G06V 10/25; G06V 10/7715; G06V 20/13; G06V 10/44;
(Continued)

(56) References Cited

U.S. PATENT DOCUMENTS

| 8,731,305 | B1* | 5/2014 | Mantri | ................. | G06V 10/754 |
| | | | | | 701/450 |
| 2017/0116477 | A1* | 4/2017 | Chen | .................. | G01C 21/3819 |

(Continued)

FOREIGN PATENT DOCUMENTS

| CN | 110008872 A | 7/2019 |
| CN | 112328730 A | 2/2021 |
| CN | 114385662 A | 4/2022 |

OTHER PUBLICATIONS

First Search Report in corresponding China Application No. 2022105300083 issued Dec. 28, 2023.
(Continued)

*Primary Examiner* — Syed Haider
(74) *Attorney, Agent, or Firm* — Husch Blackwell LLP

(57) ABSTRACT

Provided are a road network extraction method, a device, and a storage medium, which relate to the technical field of artificial intelligence and, in particular, to the fields of image processing, computer vision, and the like and are specifically applicable to scenarios such as intelligent transportation and a smart city. A specific implementation scheme includes: extracting a first road network of a target region according to user trajectories of the target region; extracting a second road network of the target region according to a satellite aerial image of the target region; and extract a target road network of the target region according to the first road network, the second road network, and the user trajectories. Efficient and accurate road network extraction can be achieved through techniques in embodiments of the present disclosure.

14 Claims, 11 Drawing Sheets

(51) Int. Cl.
   *G06V 10/25*   (2022.01)
   *G06V 10/77*   (2022.01)
   *G06V 20/13*   (2022.01)
   *G06V 10/42*   (2022.01)
   *G06V 10/44*   (2022.01)

(52) U.S. Cl.
   CPC .......... *G06V 10/25* (2022.01); *G06V 10/7715* (2022.01); *G06V 20/13* (2022.01); *G06V 10/42* (2022.01); *G06V 10/44* (2022.01)

(58) Field of Classification Search
   CPC ............. G06V 120/454; G06V 10/764; G01C 21/3852; G01C 21/3819
   See application file for complete search history.

(56) References Cited

U.S. PATENT DOCUMENTS

| | | | |
|---|---|---|---|
| 2019/0130182 A1* | 5/2019 | Zang | G06V 20/182 |
| 2021/0356278 A1* | 11/2021 | Li | G01C 21/32 |
| 2022/0067370 A1 | 3/2022 | Huang et al. | |
| 2022/0383024 A1* | 12/2022 | Yadav | G06V 10/421 |
| 2023/0196760 A1* | 6/2023 | Dorum | G06T 3/60 |
| | | | 382/157 |
| 2023/0221140 A1* | 7/2023 | Rodrigues | B60W 60/00 |
| | | | 701/400 |

OTHER PUBLICATIONS

First Office Action in corresponding China Application No. 2022105300083 issued Jan. 4, 2024.

\* cited by examiner

ROAD NETWORK EXTRACTION METHOD, DEVICE, AND STORAGE MEDIUM

CROSS-REFERENCE TO RELATED APPLICATION(S)

This application claims priority to Chinese Patent Application No. 202210530008.3 filed May 16, 2022, the disclosure of which is incorporated herein by reference in its entirety.

TECHNICAL FIELD

The present disclosure relates to the technical field of artificial intelligence and, in particular, to the fields of image processing, computer vision, and the like and may be specifically applied to scenarios such as intelligent transportation and a smart city.

BACKGROUND

With the rapid progress of urbanization, traffic facilities of infrastructure are rapidly developed and updated, resulting in increasingly high complexity of a traffic network. People increasingly rely on navigation during travels. Therefore, the accuracy of road data in the navigation is essential to the travelling experiences of users. As a result, roads need to be updated in time. The extraction of a road network from an actual scene is a core link in the process of updating the roads.

SUMMARY

The present disclosure provides a road network extraction method and apparatus, a device, and a storage medium.

According to an aspect of the present disclosure, a road network extraction method is provided. The method includes the steps described below.

A first road network of a target region is extracted according to user trajectories of the target region.

A second road network of the target region is extracted according to a satellite aerial image of the target region.

A target road network of the target region is extracted according to the first road network, the second road network, and the user trajectories.

According to another aspect of the present disclosure, an electronic device is provided. The electronic device includes at least one processor and a memory.

The memory is communicatively connected to the at least one processor.

The memory stores an instruction executable by the at least one processor to enable the at least one processor to perform the road network extraction method according to any embodiment of the present disclosure.

According to another aspect of the present disclosure, a non-transitory computer-readable storage medium is provided. The non-transitory computer-readable storage medium is configured to store a computer instruction for causing a computer to perform the road network extraction method according to any embodiment of the present disclosure.

According to the techniques of the present disclosure, efficient and accurate road network extraction can be achieved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solutions and not to limit the present disclosure. In the drawings.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

It is to be noted that the collection, storage, use, processing, transmission, provision, and disclosure of user trajectories, a satellite aerial image, and the like involved in the technical solutions of the present disclosure conform to relevant laws and regulations and do not violate the public policy doctrine.

Figure 1:
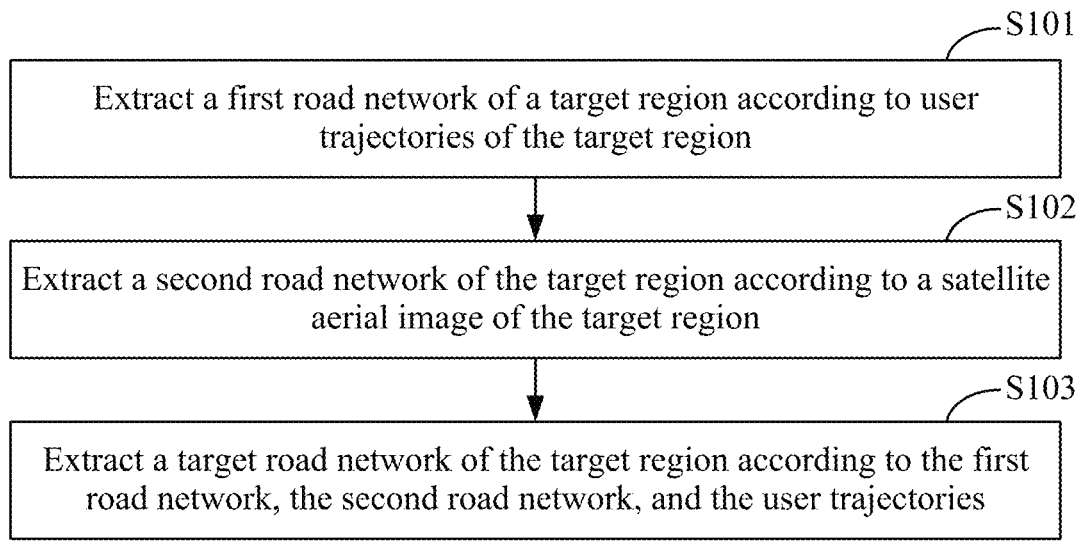
FIG. 1 is a flowchart of a road network extraction method according to an embodiment of the present disclosure.

FIG. 1 is a flowchart of a road network extraction method according to an embodiment of the present disclosure. The method is applicable to the case where a road network is extracted from an actual scene. The method may be performed by a road network extraction apparatus. The apparatus may be implemented by software and/or hardware and may be integrated into an electronic device carrying a road network extraction function. As shown in FIG. 1, the road network extraction method in the embodiment may include S101 to S103.

In S101, a first road network of a target region is extracted according to user trajectories of the target region.

Optionally, an electronic map may be evenly divided in advance by using a map block of a set size. The target region in the embodiment is a region which is in a real environment and to which any map block in the electronic map is mapped.

The user trajectories in the embodiment may be trajectories of users travelling in the target region at current time and within a period of time before the current time. Optionally, the user trajectories may include, but are not limited to, driving trajectories, riding trajectories, walking trajectories, and the like. The user trajectories of the target region are acquired in many manners, which is not limited in the embodiment. For example, the user trajectories of the target region may be directly acquired from a database of a map application. Alternatively, the user trajectories may be acquired from roadside devices in the target region.

The road network is a road topological network and may specifically be a network composed of multiple criss-crossed roads.

Specifically, in response to a road network extraction requirement of the target region, the user trajectories of the target region are acquired, and the first road network of the target region is extracted based on the acquired user trajectories. For example, a regional trajectory image may be constructed based on the acquired user trajectories and the constructed regional trajectory image is refined, so as to extract the first road network of the target region. Whether the target region has the road network extraction requirement is determined in many manners, which is not limited in the embodiment. For example, that the target region has the road network extraction requirement may be determined in response to monitoring that the current time reaches road network extraction time of the target region or in response to receiving a road network extraction request of the target region.

In S102, a second road network of the target region is extracted according to a satellite aerial image of the target region.

The satellite aerial image is an image of the earth captured by a satellite and having coordinate information. In the embodiment, the satellite aerial image of the target region may be an image captured by the satellite and including the target region. Considering that roads are dynamically updated, a latest satellite aerial image of the target region may be acquired in the embodiment.

Optionally, the second road network of the target region may be extracted based on a pre-trained road recognition model. For example, the acquired satellite aerial image of the target region may be inputted into the pre-trained road recognition model, and the second road network of the target region may be determined based on the output of the road recognition model.

Further, since the satellite generally captures an image at a relatively wide angle, the acquired satellite aerial image may include an image outside the target region. To reduce the amount of calculations, an image block of the target region may be cut from the acquired satellite aerial image; and then the second road network of the target region is extracted based on the image block.

In S103, a target road network of the target region is extracted according to the first road network, the second road network, and the user trajectories.

The target road network is the finally extracted road network of the target region.

Optionally, the first road network, the second road network, and the user trajectories may be processed based on a preset processing logic, so as to obtain the target road network of the target region. For example, the regional trajectory image may be constructed based on the user trajectories and the first road network and the second road network may be fused based on the regional trajectory image, so as to obtain the target road network of the target region.

Further, after the target road network of the target region is extracted, the extracted target road network may be matched with an existing road network of the target region stored in the electronic map; and new roads in the target region may be acquired in time according to a matching result and updated to the electronic map in time.

It will be appreciated that road networks of multiple regions can be extracted in batches by the road network extraction method provided in the embodiment so that roads in the electronic map can be updated with high efficiency and on a large scale.

According to the technical solutions provided in the embodiment of the present disclosure, the target road network of the target region can be accurately extracted in conjunction with the first road network extracted based on the user trajectories of the target region, the second road network extracted based on the satellite aerial image of the target region, and the user trajectories. In the preceding solutions, two types of modal data, including the user trajectories and the satellite aerial image, are fully utilized so that the efficiency and accuracy of road network extraction are improved, ensuring the subsequent update of road data in the electronic map in time.

Optionally, in the embodiment, the user trajectories are acquired in the following optional manner: determining a cumulative time length according to a total trajectory length in the target region; and acquiring the user trajectories of the target region within the cumulative time length. In the embodiment, the total trajectory length is a sum of trajectories of all users traveling in the target region within a period of time (for example, 10 minutes).

Specifically, the total trajectory length in the target region may be determined; the cumulative time length of the target region is determined according to the total trajectory length in the target region and a pre-constructed mapping relationship between the total trajectory length and the cumulative time length; and the user trajectories of the target region within the cumulative time length may be acquired. For example, the cumulative time length is half a month, and user trajectories within half a month before the current time may be directly acquired from the database of the map application.

Figure 2:
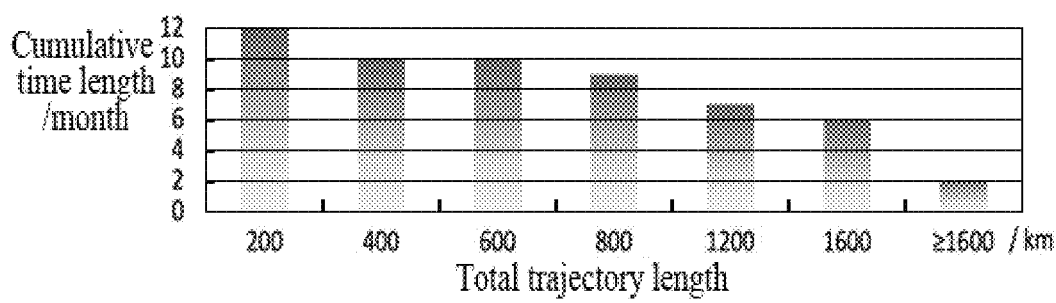
FIG. 2 is a schematic diagram of a mapping relationship between a total trajectory length and a cumulative time length according to an embodiment of the present disclosure.

The mapping relationship is determined through a statistical analysis of a large volume of user trajectory data of different regions and shown in FIG. 2.

It will be appreciated that different regions in the actual scene have different human flow rates, that is, different regions have different densities of trajectories within a period of time. In the embodiment, the method of determining the cumulative time length based on the total trajectory length is introduced and actual human flow rates in regions are fully considered so that the number of user trajectories acquired is more reasonable, providing a basis for the subsequent efficient and accurate extraction of the first road network.

Figure 3:
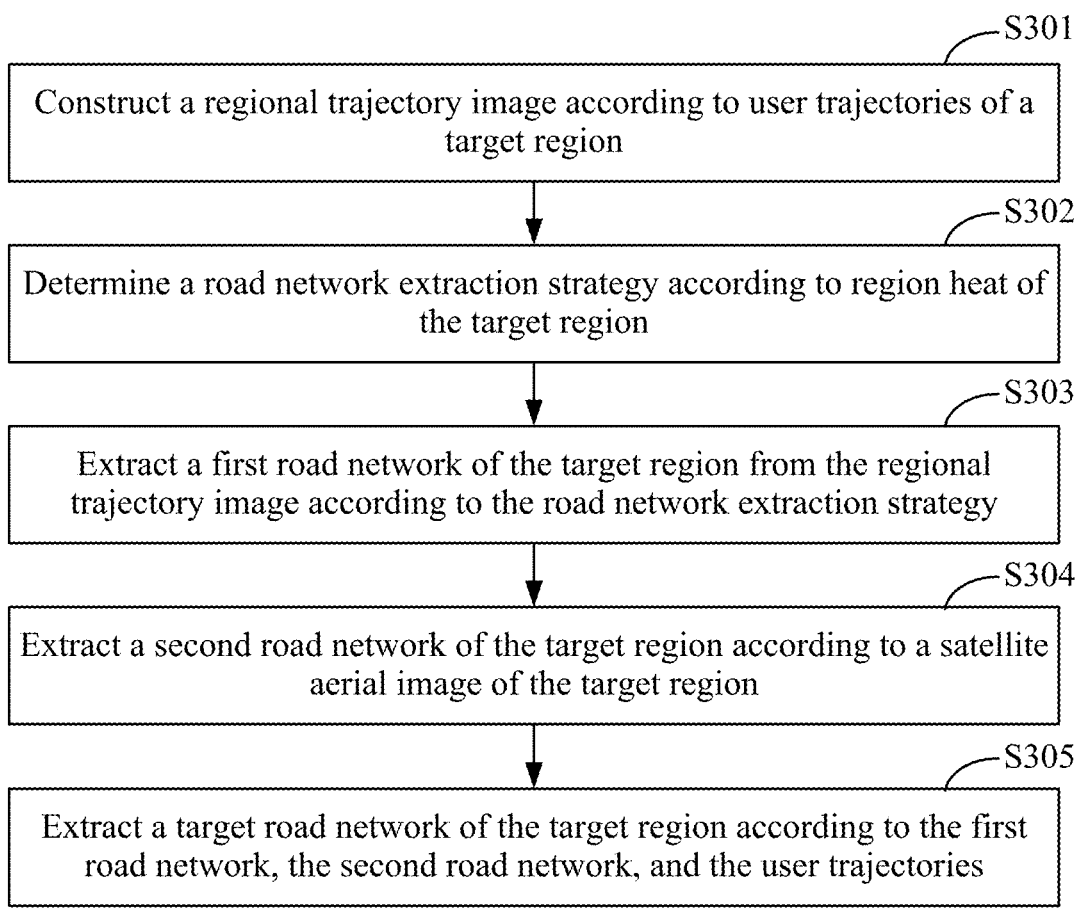
FIG. 3 is a flowchart of another road network extraction method according to an embodiment of the present disclosure.

FIG. 3 is a flowchart of another road network extraction method according to an embodiment of the present disclosure. Based on the preceding embodiment, the step in which the first road network of the target region is extracted according to the user trajectories of the target region is further described in detail in the embodiment. As shown in FIG. 3, the road network extraction method in the embodiment may include S301 to S305.

In S301, a regional trajectory image is constructed according to user trajectories of a target region.

In an implementation, a blank image of a set size (which is the same as a size of a satellite aerial image) having a white background may be created and the acquired user trajectories of the target region are drawn onto the blank image, so as to obtain the regional trajectory image.

In another implementation, the regional trajectory image may be constructed in conjunction with a neural network model. For example, the acquired user trajectories of the target region may be inputted into a pre-trained trajectory image construction model so as to obtain the regional trajectory image.

In S302, a road network extraction strategy is determined according to region heat of the target region.

In the embodiment, the region heat is an index for characterizing a trajectory density of a region. Optionally, the region heat of the target region may be determined according to a total trajectory length in the target region. For example, the region heat of the target region may be determined according to the total trajectory length in the target region based on a pre-constructed correspondence between the total trajectory length and the region heat. As another example, the total trajectory length in the target region may be processed, for example, the total trajectory length in the target region is inputted into a preset region heat calculation formula so as to obtain the region heat of the target region.

The road network extraction strategy is a relevant strategy for extracting a first road network of the target region from the constructed regional trajectory image, that is, a relevant strategy for refining the constructed regional trajectory image to obtain the first road network. Optionally, in the embodiment, two different road network extraction strategies are introduced, where one road network extraction strategy is used for a region whose region heat is less than or equal to a set heat threshold, and the other road network extraction strategy is used for a region whose region heat is greater than the set heat threshold.

Specifically, the region heat of the target region may be determined according to the total trajectory length in the target region; the determined region heat is compared with the set heat threshold; and one road network extraction strategy is selected from two preset road network extraction strategies according to a comparison result.

In S303, the first road network of the target region is extracted from the regional trajectory image according to the road network extraction strategy.

Specifically, after the road network extraction strategy is determined, the first road network of the target region may be extracted from the regional trajectory image based on an extraction logic in the determined road network extraction strategy.

In S304, a second road network of the target region is extracted according to the satellite aerial image of the target region.

In S305, a target road network of the target region is extracted according to the first road network, the second road network, and the user trajectories.

According to the technical solutions provided in the embodiment of the present disclosure, the first road network is extracted, according to the road network extraction strategy determined based on the region heat of the target region, from the regional trajectory image constructed based on the user trajectories, and the target road network of the target region can be accurately extracted in conjunction with the extracted first road network, the second road network extracted based on the satellite aerial image of the target region, and the user trajectories. In the preceding solutions, with the introduction of the region heat, the index capable of characterizing the trajectory density of the region, the road network extraction strategy for the regional trajectory image is determined so that the extracted first road network is more accurate.

Optionally, as an optional embodiment of the present disclosure, in the case where the region heat of the target region is greater than the set heat threshold, the step in which the first road network of the target region is extracted from the regional trajectory image according to the road network extraction strategy may include: determining a trajectory density peak profile of a road in the regional trajectory image according to the user trajectories; and extracting the first road network of the target region from the regional trajectory image according to the trajectory density peak profile.

Figure 4:
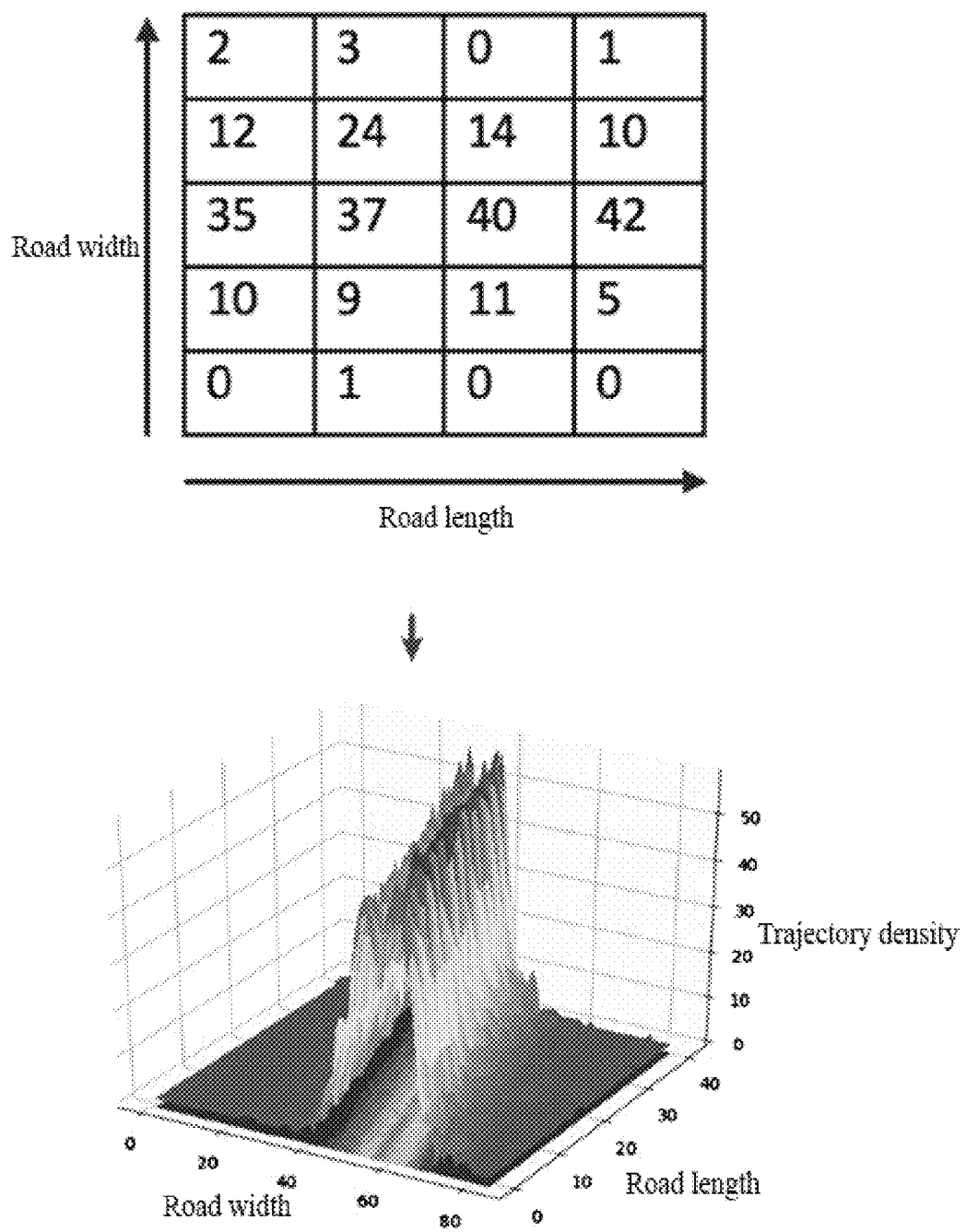
FIG. 4 is a schematic diagram of a process of determining a trajectory density peak profile according to an embodiment of the present disclosure.

Specifically, for each road in the regional trajectory image, the road is evenly divided into multiple blocks along a length direction of the road and a width direction of the road; the number of user trajectories acquired and located in each block, that is, a trajectory density of each block is counted so that a trajectory density data table is obtained; and a profile is drawn in a Gaussian filtering manner based on the trajectory density data table so that the trajectory density peak profile of the road can be obtained, as shown in FIG. 4.

Optionally, the number of peaks in the trajectory density peak profile is used for characterizing the number of roads. For example, in FIG. 4, two peaks in the trajectory density peak profile of a certain road in the regional trajectory image indicate that the road is actually two close roads.

Further, after the trajectory density peak profile of the road in the regional trajectory image is determined, the actual number of roads may be determined based on the number of peaks in the trajectory density peak profile, and the first road network of the target region may be extracted from the regional trajectory image based on the actual number of roads.

It is to be noted that in the embodiment, the trajectory density peak profile is introduced so that two close roads can be extracted in a region with dense trajectories, further improving the extraction accuracy of the first road network.

As another optional embodiment of the present disclosure, in the case where the region heat of the target region is less than or equal to the set heat threshold, the step in which the first road network of the target region is extracted from the regional trajectory image according to the road network extraction strategy may include: refining the regional trajectory image by using a convolution kernel multiple times to extract the first road network of the target region.

It will be appreciated that in the embodiment, different road network extraction strategies are used for the region whose region heat is greater than the set heat threshold and the region whose region heat is less than or equal to the set heat threshold so that the flexibility of the solutions is improved while the extraction accuracy of the first road network is ensured.

Figure 5A:
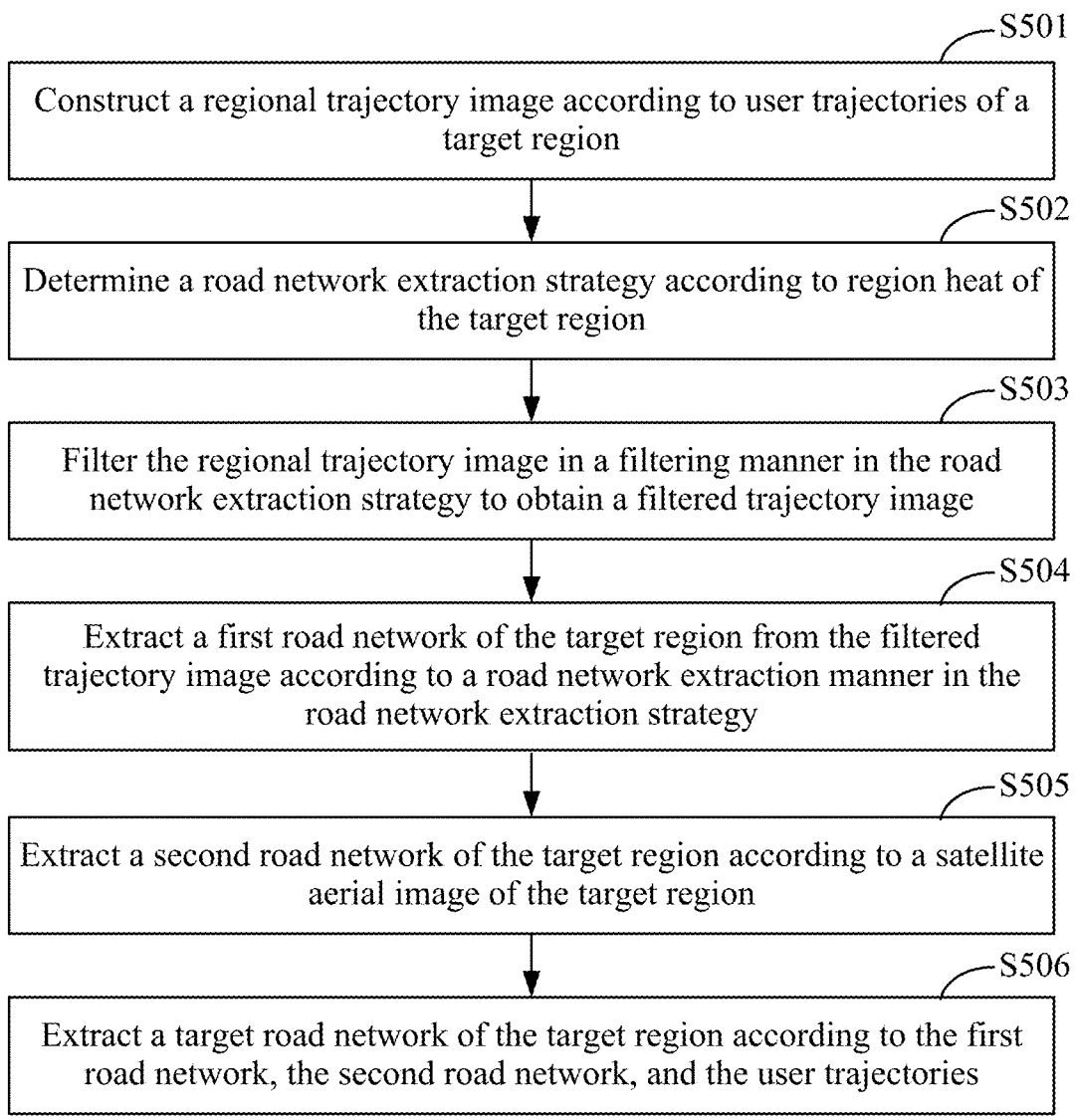
FIG. 5A is a flowchart of another road network extraction method according to an embodiment of the present disclosure.
Figure 5B:
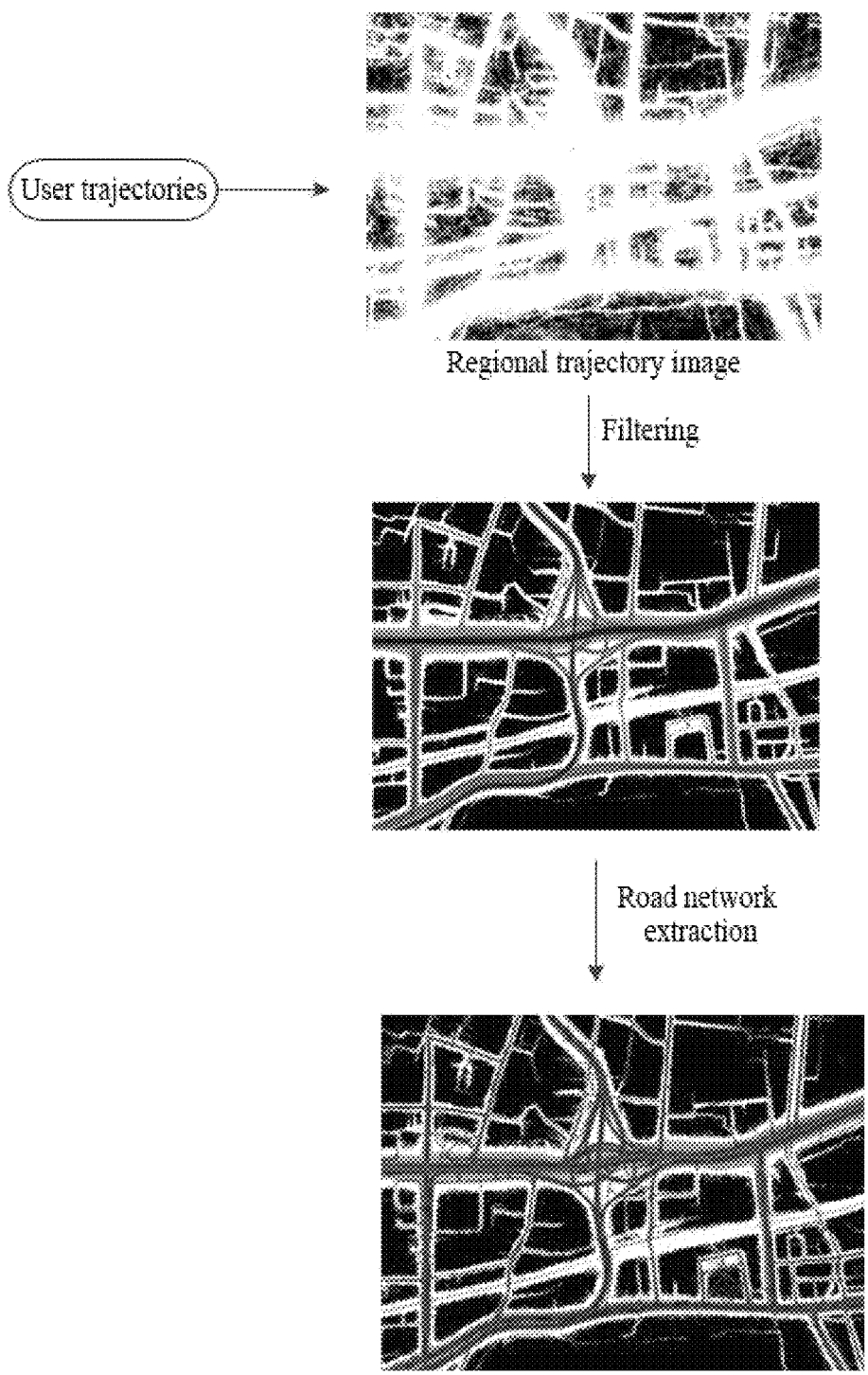
FIG. 5B is a schematic diagram of a process of extracting a first road network based on user trajectories according to an embodiment of the present disclosure.

FIG. 5A is a flowchart of another road network extraction method according to an embodiment of the present disclosure. FIG. 5B is a schematic diagram of a process of extracting a first road network based on user trajectories according to an embodiment of the present disclosure. Based on the preceding embodiments, the step in which the first road network of the target region is extracted from the regional trajectory image according to the road network extraction strategy is further described in detail in the embodiment. As shown in FIGS. 5A and 5B, the road network extraction method in the embodiment may include S501 to S506.

In S501, a regional trajectory image is constructed according to user trajectories of a target region.

In S502, a road network extraction strategy is determined according to region heat of the target region.

In the embodiment, the road network extraction strategy may include a filtering manner and a road network extraction manner. The filtering manner is a manner for denoising the regional trajectory image. The road network extraction manner is a manner for extracting a first road network.

In S503, the regional trajectory image is filtered in the filtering manner in the road network extraction strategy so that a filtered trajectory image is obtained.

Optionally, different road network extraction strategies include different filtering manners. For example, in the case where the region heat is less than or equal to a set heat threshold, the regional trajectory image may be filtered in a morphological filtering manner. In the case where the region heat is greater than the set heat threshold, the regional trajectory image may be filtered in a Gaussian filtering manner, so as to ensure the smoothness of edges.

In S504, the first road network of the target region is extracted from the filtered trajectory image according to the road network extraction manner in the road network extraction strategy.

Optionally, different road network extraction strategies include different road network extraction manners. For example, in the case where the region heat is less than or equal to the set heat threshold, the regional trajectory image may be refined by using a convolution kernel multiple times, so as to extract the first road network of the target region. In the case where the region heat is greater than the set heat threshold, a trajectory density peak profile of a road in the regional trajectory image is determined according to the user trajectories, and the first road network of the target region is extracted from the regional trajectory image according to the trajectory density peak profile.

In S505, a second road network of the target region is extracted according to a satellite aerial image of the target region.

In S506, a target road network of the target region is extracted according to the first road network, the second road network, and the user trajectories.

According to the technical solutions provided in the embodiment of the present disclosure, the regional trajectory image constructed based on the user trajectories is processed in the filtering manner and the road network extraction manner in the road network extraction strategy determined based on the region heat of the target region so that the first road network is obtained, and the target road network of the target region can be accurately extracted in conjunction with the extracted first road network, the second road network extracted based on the satellite aerial image of the target region, and the user trajectories. In the preceding solutions, the process of filtering the regional trajectory image is introduced, further improving the extraction accuracy of the first road network.

Figure 6A:
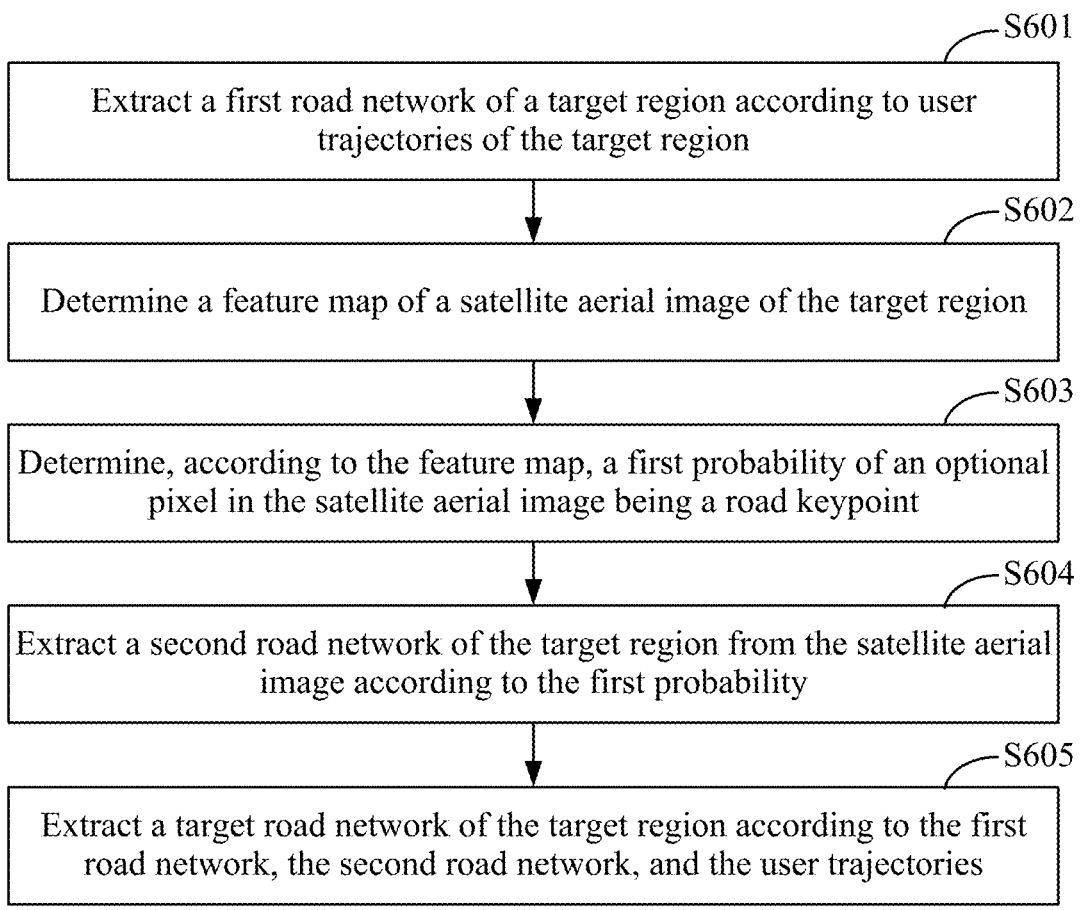
FIG. 6A is a flowchart of another road network extraction method according to an embodiment of the present disclosure.
Figure 6B:
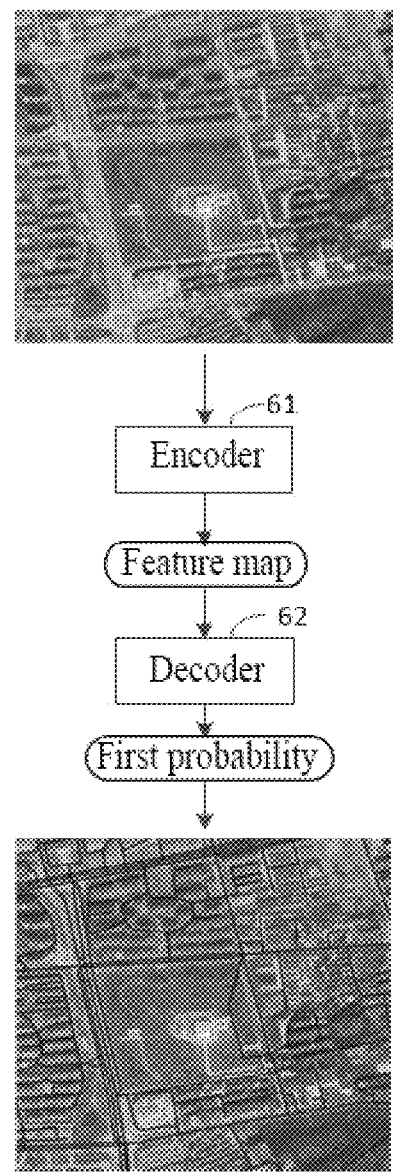
FIG. 6B is a schematic diagram of a process of extracting a second road network based on a satellite aerial image according to an embodiment of the present disclosure.

FIG. 6A is a flowchart of another road network extraction method according to an embodiment of the present disclosure. FIG. 6B is a schematic diagram of a process of extracting a second road network based on a satellite aerial image according to an embodiment of the present disclosure. Based on the preceding embodiments, the step in which the second road network of the target region is extracted according to the satellite aerial image of the target region is further described in detail in the embodiment. As shown in FIGS. 6A and 6B, the road network extraction method in the embodiment may include S601 to S605.

In S601, a first road network of a target region is extracted according to user trajectories of the target region.

In S602, a feature map of a satellite aerial image of the target region is determined.

In the embodiment, the feature map includes features extracted from the satellite aerial image. For example, as shown in FIG. 6B, the satellite aerial image is inputted into a pre-trained encoder 61 so that the feature map of the satellite aerial image can be obtained.

In S603, a first probability of an optional pixel in the satellite aerial image being a road keypoint is determined according to the feature map.

In the embodiment, each pixel in the satellite aerial image may be used as an optional pixel.

With continued reference to FIG. 6B, the feature map is inputted into a pre-trained decoder 62 so that the first probability of each optional pixel in the satellite aerial image being the road keypoint can be obtained and a probability of each optional pixel belonging to a road can also be obtained.

It is to be noted that the encoder 61 and the decoder 62 in the embodiment may be trained in the following manner: an initial encoder 61 and an initial decoder 62 are jointly trained by using a satellite aerial image with label information so as to obtain the trained encoder 61 and decoder 62. The label information may include which pixels in the satellite aerial image belong to a road and which pixels in the satellite aerial image are road keypoints.

In S604, a second road network of the target region is extracted from the satellite aerial image according to the first probability.

Optionally, a target pixel may be selected from optional pixels according to the first probability of each optional pixel in the satellite aerial image being the road keypoint. For example, a pixel whose first probability is greater than a probability threshold among the optional pixels may be selected as the target pixel. Target pixels are connected, so as to obtain the second road network of the target region.

Further, the optional pixels may be primarily screened according to the probability of each optional pixel in the satellite aerial image belonging to the road, so as to obtain candidate pixels; the target pixel is selected from the candidate pixels according to a first probability of a candidate pixel being the road keypoint; and the target pixels are connected, so as to obtain the second road network of the target region.

In S605, a target road network of the target region is extracted according to the first road network, the second road network, and the user trajectories.

According to the technical solutions provided in the embodiment of the present disclosure, the first road network is extracted based on the user trajectories of the target region, the first probability of the optional pixel in the satellite aerial image being the road keypoint may be determined according to the feature map of the satellite aerial image of the target region, and the second road network of the target region may be extracted from the satellite aerial image based on the first probability; and the target road network of the target region can be accurately extracted in conjunction with the first road network, the second road network, and the user trajectories. In the preceding solutions, an optional manner for extracting a road network based on the satellite aerial image is provided, which provides data support for the accurate extraction of the target road network.

Figure 7A:
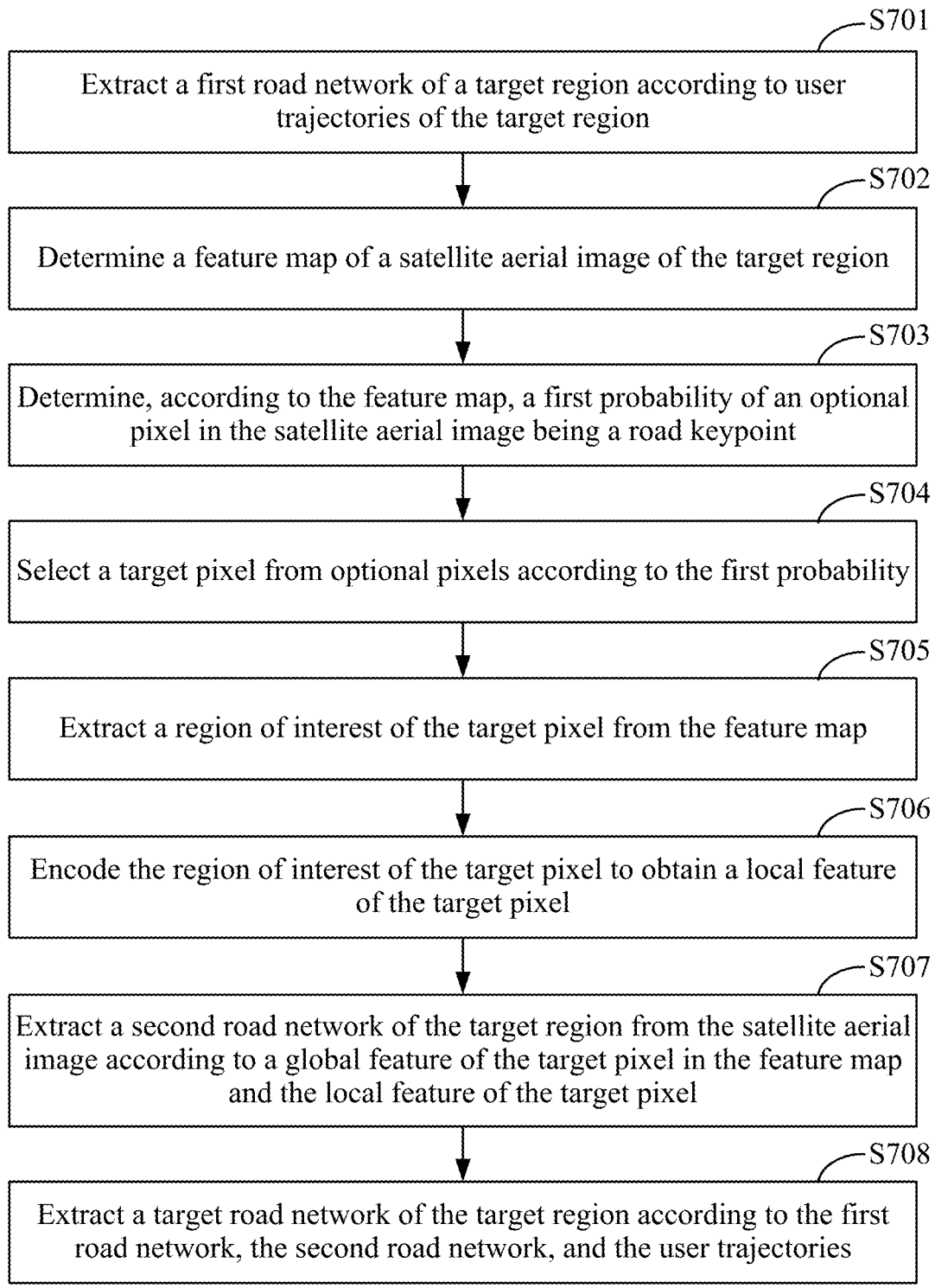
FIG. 7A is a flowchart of another road network extraction method according to an embodiment of the present disclosure.
Figure 7B:
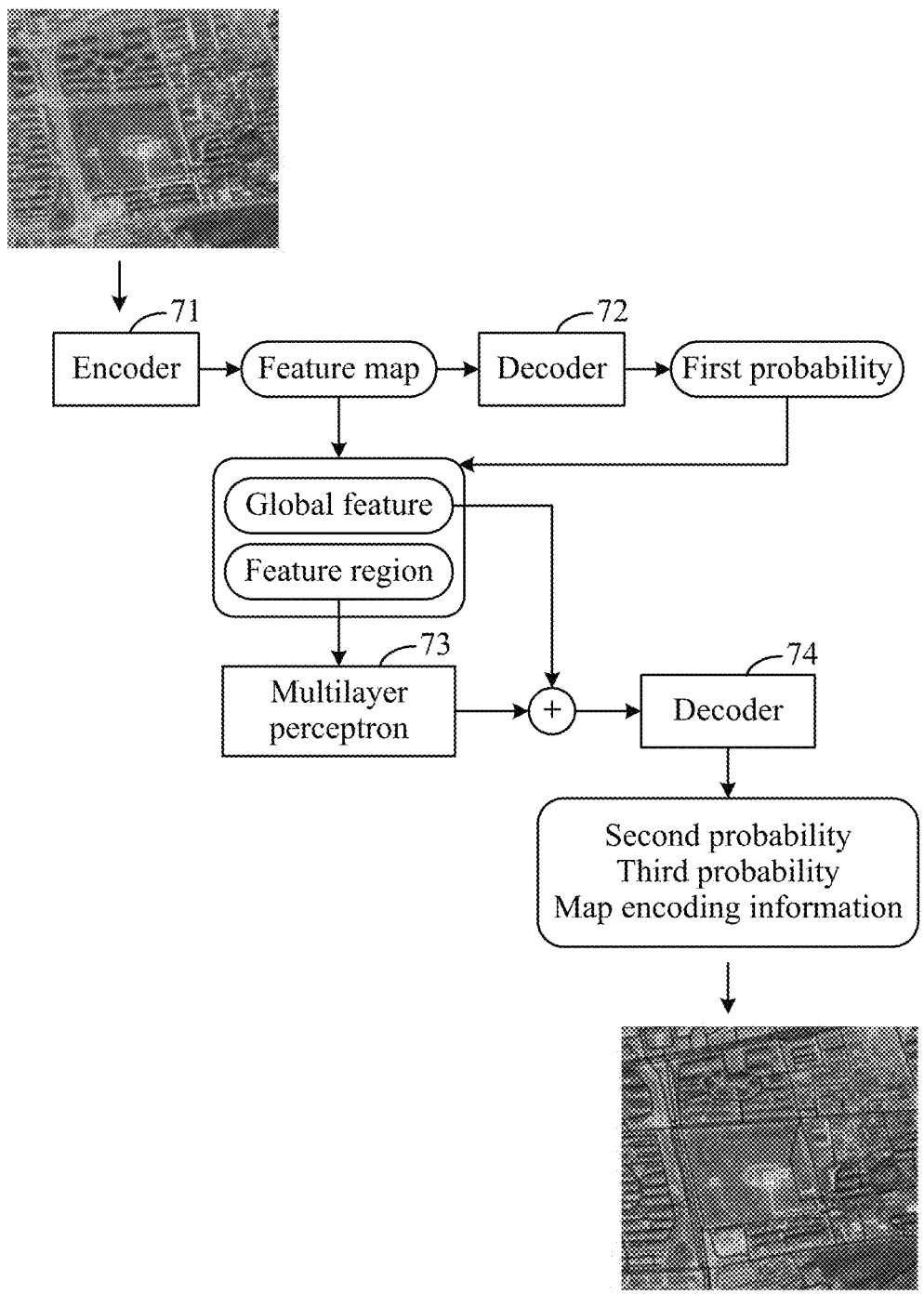
FIG. 7B is a schematic diagram of another process of extracting a second road network based on a satellite aerial image according to an embodiment of the present disclosure.

FIG. 7A is a flowchart of another road network extraction method according to an embodiment of the present disclosure. FIG. 7B is a schematic diagram of another process of extracting a second road network based on a satellite aerial image according to an embodiment of the present disclosure. Based on the preceding embodiments, the step in which the second road network of the target region is extracted according to the satellite aerial image of the target region is still further described in detail in the embodiment. As shown in FIGS. 7A and 7B, the road network extraction method in the embodiment may include S701 to S708.

In S701, a first road network of a target region is extracted according to user trajectories of the target region.

In S702, a feature map of a satellite aerial image of the target region is determined.

In S703, a first probability of an optional pixel in the satellite aerial image being a road keypoint is determined according to the feature map.

For example, referring to FIG. 7B, the satellite aerial image is inputted into an encoder 71 so that the feature map of the satellite aerial image can be obtained; and the feature map is inputted into a decoder 72 so that the first probability of each optional pixel in the satellite aerial image being the road keypoint can be obtained.

In S704, a target pixel is selected from optional pixels according to the first probability.

Optionally, a pixel whose first probability is greater than a probability threshold among the optional pixels may be selected as the target pixel.

In S705, a region of interest of the target pixel is extracted from the feature map.

Optionally, each target pixel may correspond to one or more regions of interest. Further, to extract a second road network more accurately, each target pixel preferably corresponds to multiple regions of interest in the embodiment.

For example, for each target pixel, corresponding regions each having a size of S×S (for example, 3×3) are extracted from the feature map with the target pixel in the center, at an upper left corner, at a lower left corner, at an upper right corner, and at a lower right corner separately and the corresponding regions are used as the regions of interest of the target pixel. That is, with the target pixel in the center, the corresponding region having the size of S×S is extracted from the feature map as one region of interest of the target pixel; with the target pixel at the upper left corner, the corresponding region having the size of S×S is extracted from the feature map as one region of interest of the target pixel; with the target pixel at the lower left corner, the corresponding region having the size of S×S is extracted from the feature map as one region of interest of the target pixel; with the target pixel at the upper right corner, the corresponding region having the size of S×S is extracted from the feature map as one region of interest of the target pixel; with the target pixel at the lower right corner, the corresponding region having the size of S×S is extracted from the feature map as one region of interest of the target pixel.

In S706, the region of interest of the target pixel is encoded so that a local feature of the target pixel is obtained.

For each target pixel, the local feature of the target pixel is a feature for characterizing the target pixel from a local perspective.

Optionally, for each target pixel, the extracted regions of interest of the target pixel may be encoded (for example, in an extraction sequence) so that a feature region of the target pixel, that is, a region of 5×S×S, is obtained.

With continued reference to FIG. 7B, the feature region of the target pixel is inputted into a multilayer perceptron (MLP) 73 for feature sensing so that the local feature of the target pixel can be obtained.

In S707, the second road network of the target region is extracted from the satellite aerial image according to a global feature of the target pixel in the feature map and the local feature of the target pixel.

Optionally, the feature map of the satellite aerial image extracted by the encoder 71 may specifically include a feature of each optional pixel in the satellite aerial image, that is, the encoder 71 encodes each optional pixel in the satellite aerial image from a global perspective. That is to say, relative to the local feature, the feature map includes the global feature of each optional pixel.

Specifically, after the local feature of each target pixel is determined, the second road network of the target region may be determined according to the local feature and the global feature of each target pixel. For example, the local feature and the global feature of each target pixel may be inputted into a pre-trained decoder (which is different from the decoder 72), and the second road network of the target region is extracted from the satellite aerial image based on the output of the decoder.

In an optional manner, a fused feature of the target pixel may be determined according to the global feature of the target pixel in the feature map and the local feature of the target pixel; the fused feature of the target pixel is encoded so that a second probability of the target pixel being the road keypoint, a third probability of the target pixel belonging to a road, and map encoding information of the target pixel are obtained; and the second road network of the target region is extracted from the satellite aerial image according to the second probability of the target pixel being the road keypoint, the third probability of the target pixel belonging to the road, and the map encoding information of the target pixel.

For each target pixel, the map encoding information of the target pixel may include angle information between the target pixel and an adjacent road keypoint in a road intersection scene. Optionally, in the case where no roads intersect in the target region, the map encoding information includes no content, that is, is null information.

With continued reference to FIG. 7B, for each target pixel, the global feature of the target pixel extracted by the encoder 71 may be fused with the local feature of the target pixel extracted by the multilayer perceptron 73 so that the fused feature of the target pixel is obtained; and the fused feature of the target pixel is inputted into a decoder 74 so that the second probability of the target pixel being the road keypoint, the third probability of the target pixel belonging to the road, and the map encoding information of the target pixel can be obtained.

Then, target pixels may be screened according to the second probability of each target pixel being the road keypoint and the third probability of each target pixel belonging to the road; and the screened target pixels are connected so as to obtain the second road network of the target region. Further, in the process of connecting the screened target pixels, in response to an intersection scene, the screened target pixels are connected based on the map encoding information of a target pixel at an intersection.

It is to be noted that the encoder 71, the decoder 72, the multilayer perceptron 73, and the decoder 74 in the embodiment may be trained in the following manner: an initial encoder 71, an initial decoder 72, an initial multilayer perceptron 73, and an initial decoder 74 are jointly trained by using a satellite aerial image with label information so as to obtain the trained encoder 71, decoder 72, multilayer perceptron 73, and decoder 74. The label information may include which pixels in the satellite aerial image belong to a road and which pixels in the satellite aerial image are road keypoints.

In S708, a target road network of the target region is extracted according to the first road network, the second road network, and the user trajectories.

According to the technical solutions provided in the embodiment of the present disclosure, the first road network is extracted based on the user trajectories of the target region; the first probability of the optional pixel in the satellite aerial image being the road keypoint may be determined according to the feature map of the satellite aerial image of the target region, and some target pixels are selected based on the first probability; regions of interest of the selected target pixels are extracted from the feature map, local features of the selected target pixels are determined, and the second road network of the target region is extracted from the satellite aerial image based on the local features of the target pixels and global features of the target pixels in the feature map; and the target road network of the target region can be accurately extracted in conjunction with the first road network, the second road network, and the user trajectories. In the preceding solutions, the extraction accuracy of the second road network is improved in conjunction with local features and global features of pixels. Further, the process of extracting the second road network from the global to the local of pixels in the embodiment is essentially a manner for extracting a road network from the satellite aerial image more finely.

Figure 8:
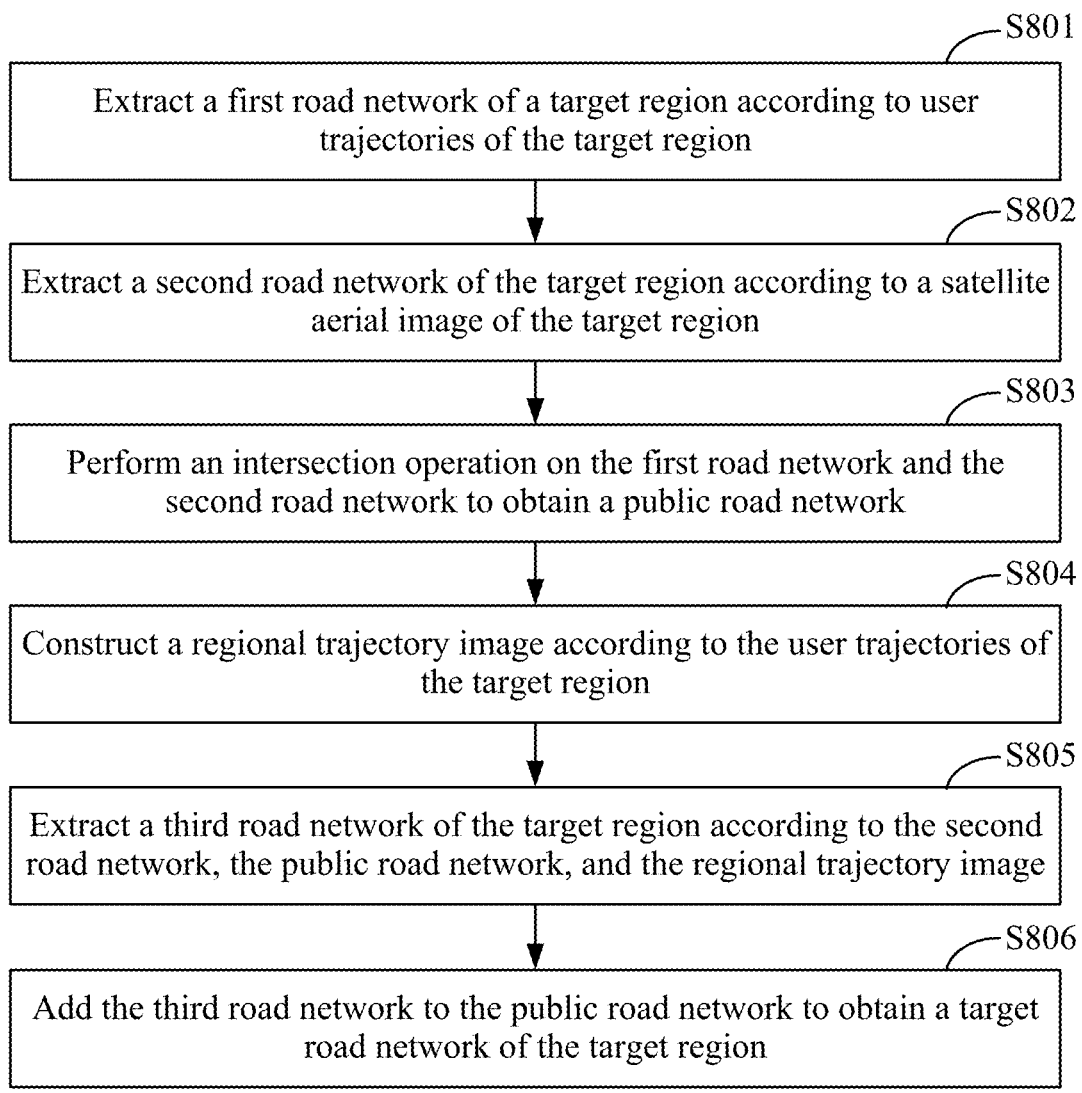
FIG. 8 is a flowchart of another road network extraction method according to an embodiment of the present disclosure.

FIG. 8 is a flowchart of another road network extraction method according to an embodiment of the present disclosure. Based on the preceding embodiments, the step in which the target road network of the target region is extracted according to the first road network, the second road network, and the user trajectories is further described in detail in the embodiment. As shown in FIG. 8, the road network extraction method in the embodiment may include S801 to S806.

In S801, a first road network of a target region is extracted according to user trajectories of the target region.

In S802, a second road network of the target region is extracted according to a satellite aerial image of the target region.

In S803, an intersection operation is performed on the first road network and the second road network so that a public road network is obtained.

The public road network is the same road network in the first road network and the second road network.

Specifically, an intersection between the first road network extracted based on the user trajectories and the second road network extracted based on the satellite aerial image may be used as the public road network.

In S804, a regional trajectory image is constructed according to the user trajectories of the target region.

In S805, a third road network of the target region is extracted according to the second road network, the public road network, and the regional trajectory image.

In an implementation, the second road network, the public road network, and the regional trajectory image may be inputted together to a pre-trained road network extraction network, and the third road network of the target region may be outputted from the road network extraction network.

In another implementation, another road network in the second road network except the public road network may be determined; and the third road network is extracted from the another road network according to the regional trajectory image.

Specifically, the public road network may be removed from the second road network so that the another road network is obtained. For each road in the another road network, it is checked from the regional trajectory image whether at least two user trajectories pass through the road. If not, the road is removed from the another road network. If so, the road is retained.

The third road network is composed of the finally retained roads in the another road network.

In S806, the third road network is added to the public road network so that a target road network of the target region is obtained.

Specifically, the extracted third road network is added to the public road network; and the public road network with the third road network added is smoothed and used as the finally extracted road network of the target region, that is, the target road network.

It is to be noted that the manner for extracting a road network based on the user trajectories has relatively high accuracy, but useful trajectories are easily filtered out in a filtering process; and the manner for extracting a road network based on the satellite aerial image has a high recall, but its accuracy is not high enough. In the embodiment, road information wrongly filtered out can be recovered based on the second road network predicted from the satellite aerial image in conjunction with the regional trajectory image and added to the public road network so that the finally presented target road network fits an actual scene better.

According to the technical solutions provided in the embodiment of the present disclosure, the intersection operation is performed on the first road network extracted based on the user trajectories of the target region and the second road network extracted based on the satellite aerial image of the target region so that the public road network can be obtained; the third road network wrongly filtered out is extracted based on the obtained public road network, the second road network, and the regional trajectory image constructed based on the user trajectories; and the third road network is added to the public road network so that the target road network of the target region can be obtained. In the preceding solutions, the road information wrongly filtered out can be recovered based on the second road network predicted from the satellite aerial image in conjunction with the regional trajectory image and added to the public road network so that the finally presented target road network fits the actual scene better, that is, the efficiency and accuracy of road network extraction are improved.

For the same road in the actual scene, a certain difference exists between the extraction based on the user trajectories and the extraction based on the satellite aerial image. Thus, to prevent one road in the actual scene from being extracted into two roads in the process of extracting the public road network, the process of extracting the public road network is further optimized in the embodiment based on the preceding embodiments. Optionally, the step in which the intersection operation is performed on the first road network and the second road network so that the public road network is obtained may include: performing the intersection operation on the first road network and the second road network to obtain an intermediate road network; and performing deduplication on the intermediate road network according to a road similarity to obtain the public road network.

Specifically, the intersection between the first road network extracted based on the user trajectories and the second road network extracted based on the satellite aerial image is used as the intermediate road network; a similarity between two roads (that is, the road similarity) in the intermediate road network is calculated; in the case where a road similarity between any two roads is greater than a set value, it indicates that the two roads correspond to the same road in the actual scene. In this case, a shorter road of the two roads may be eliminated. The road similarity between two roads may be determined according to an angle and a distance between the two roads.

The intermediate road network processed based on the road similarity is used as the public road network.

Figure 9:
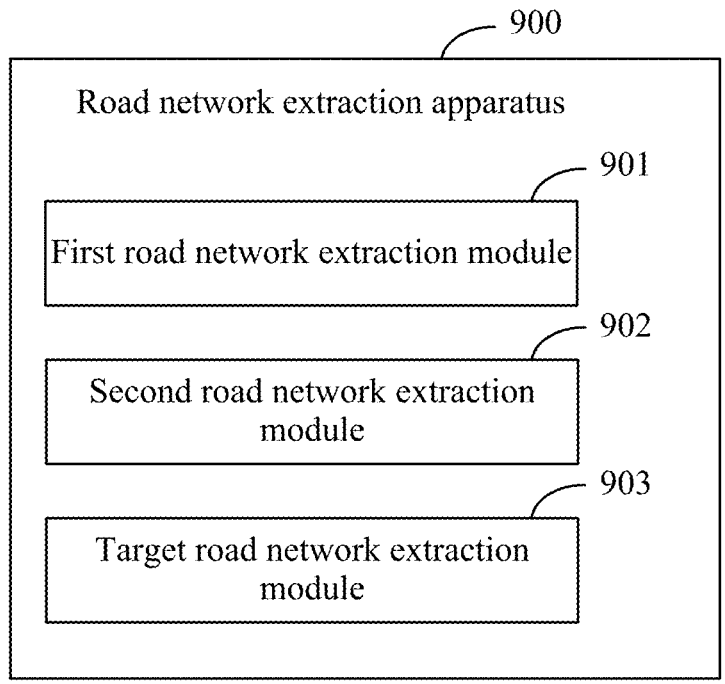
FIG. 9 is a structural diagram of a road network extraction apparatus according to an embodiment of the present disclosure.

FIG. 9 is a structural diagram of a road network extraction apparatus according to an embodiment of the present disclosure. The embodiment of the present disclosure is applicable to the case where a road network is extracted from an actual scene. The apparatus may be implemented by software and/or hardware and may perform the road network extraction method according to any embodiment of the present disclosure. As shown in FIG. 9, a road network extraction apparatus 900 includes a first road network extraction module 901, a second road network extraction module 902, and a target road network extraction module 903.

The first road network extraction module 901 is configured to extract a first road network of a target region according to user trajectories of the target region.

The second road network extraction module 902 is configured to extract a second road network of the target region according to a satellite aerial image of the target region.

The target road network extraction module 903 is configured to extract a target road network of the target region according to the first road network, the second road network, and the user trajectories.

According to the technical solutions provided in the embodiment of the present disclosure, the target road network of the target region can be accurately extracted in conjunction with the first road network extracted based on the user trajectories of the target region, the second road network extracted based on the satellite aerial image of the target region, and the user trajectories. In the preceding solutions, two types of modal data, including the user trajectories and the satellite aerial image, are fully utilized so that the efficiency and accuracy of road network extraction are improved, ensuring the subsequent update of road data in an electronic map in time.

For example, the first road network extraction module 901 includes a first trajectory image construction unit, an extraction strategy determination unit, and a first road network extraction unit.

The first trajectory image construction unit is configured to construct a regional trajectory image according to the user trajectories of the target region.

The extraction strategy determination unit is configured to determine a road network extraction strategy according to region heat of the target region.

The first road network extraction unit is configured to extract the first road network of the target region from the regional trajectory image according to the road network extraction strategy.

For example, the first road network extraction unit is configured to, in the case where the region heat is greater than a set heat threshold, determine a trajectory density peak profile of a road in the regional trajectory image according to the user trajectories and extract the first road network of the target region from the regional trajectory image according to the trajectory density peak profile.

For example, the first road network extraction unit is further configured to filter the regional trajectory image in a filtering manner in the road network extraction strategy to obtain a filtered trajectory image and extract the first road network of the target region from the filtered trajectory image according to a road network extraction manner in the road network extraction strategy.

For example, the second road network extraction module 902 includes a feature map determination unit, a first probability determination unit, and a second road network extraction unit.

The feature map determination unit is configured to determine a feature map of the satellite aerial image of the target region.

The first probability determination unit is configured to determine, according to the feature map, a first probability of an optional pixel in the satellite aerial image being a road keypoint.

The second road network extraction unit is configured to extract the second road network of the target region from the satellite aerial image according to the first probability.

For example, the second road network extraction unit includes a target pixel determination subunit, a region determination subunit, a local feature determination subunit, and a second road network extraction subunit.

The target pixel determination subunit is configured to select a target pixel from optional pixels according to the first probability.

The region determination subunit is configured to extract a region of interest of the target pixel from the feature map.

The local feature determination subunit is configured to encode the region of interest of the target pixel to obtain a local feature of the target pixel.

The second road network extraction subunit is configured to extract the second road network of the target region from the satellite aerial image according to a global feature of the target pixel in the feature map and the local feature of the target pixel.

For example, the second road network extraction subunit is configured to determine a fused feature of the target pixel according to the global feature of the target pixel in the feature map and the local feature of the target pixel, encode the fused feature of the target pixel to obtain a second probability of the target pixel being the road keypoint, a third probability of the target pixel belonging to a road, and map encoding information of the target pixel, and extract the second road network of the target region from the satellite aerial image according to the second probability of the target pixel being the road keypoint, the third probability of the target pixel belonging to the road, and the map encoding information of the target pixel.

For example, the target road network extraction module 903 includes a public road network determination unit, a second trajectory image construction unit, a third road network extraction unit, and a target road network extraction unit.

The public road network determination unit is configured to perform an intersection operation on the first road network and the second road network to obtain a public road network.

The second trajectory image construction unit is configured to construct the regional trajectory image according to the user trajectories of the target region.

The third road network extraction unit is configured to extract a third road network of the target region according to the second road network, the public road network, and the regional trajectory image.

The target road network extraction unit is configured to add the third road network to the public road network to obtain the target road network of the target region.

For example, the public road network determination unit is configured to perform the intersection operation on the first road network and the second road network to obtain an intermediate road network and perform deduplication on the intermediate road network according to a road similarity to obtain the public road network.

For example, the third road network extraction unit is configured to determine another road network in the second road network except the public road network and extract the third road network from the another road network according to the regional trajectory image.

For example, the preceding apparatus further includes a cumulative time length determination module and a user trajectory acquisition module.

The cumulative time length determination module is configured to determine a cumulative time length according to a total trajectory length in the target region.

The user trajectory acquisition module is configured to acquire the user trajectories of the target region within the cumulative time length.

According to embodiments of the present disclosure, the present disclosure further provides an electronic device, a readable storage medium, and a computer program product.

Figure 10:
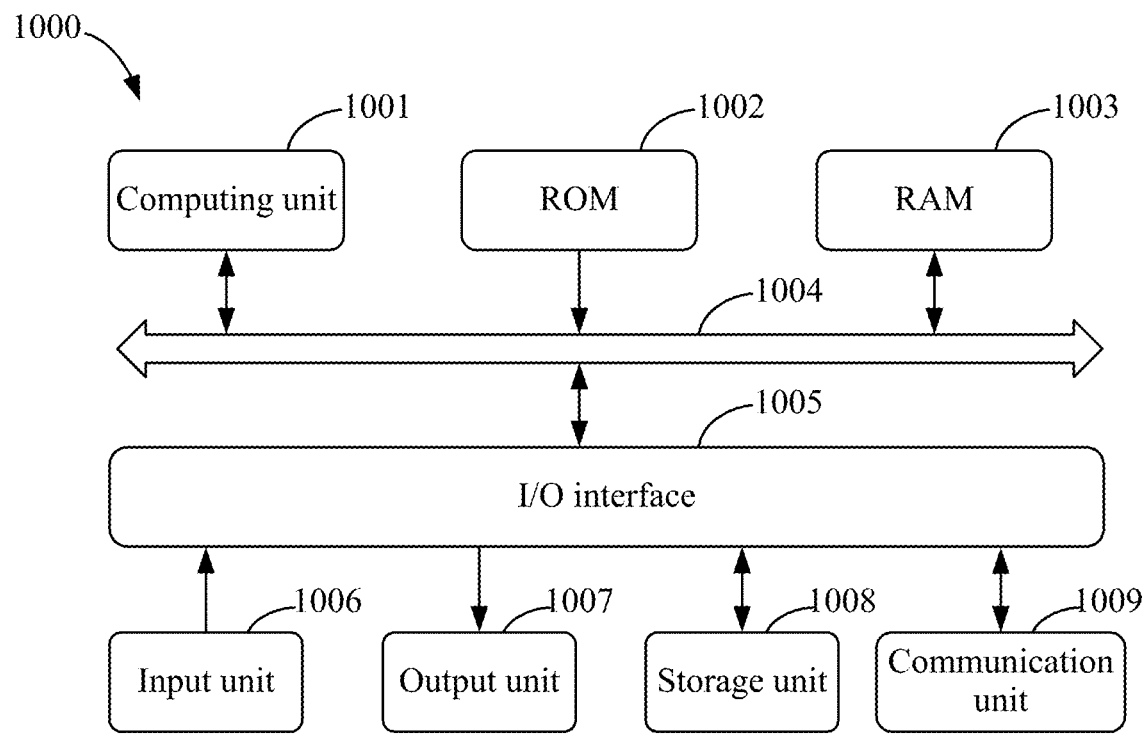
FIG. 10 is a block diagram of an electronic device for implementing a road network extraction method according to an embodiment of the present disclosure.

FIG. 10 is a block diagram illustrative of an exemplary electronic device 1000 that may be used for implementing embodiments of the present disclosure. The electronic device is intended to represent various forms of digital computers, for example, laptop computers, desktop computers, worktables, personal digital assistants, servers, blade servers, mainframe computers, and other applicable computers. The electronic device may also represent various forms of mobile devices, for example, personal digital assistants, cellphones, smartphones, wearable devices, and other similar computing devices. Herein the shown components, the connections and relationships between these components, and the functions of these components are illustrative only and are not intended to limit the implementation of the present disclosure as described and/or claimed herein.

As shown in FIG. 10, the electronic device 1000 includes a computing unit 1001. The computing unit 1001 may perform various appropriate actions and processing according to a computer program stored in a read-only memory (ROM) 1002 or a computer program loaded into a random-access memory (RAM) 1003 from a storage unit 1008. Various programs and data required for operations of the electronic device 1000 may also be stored in the RAM 1003. The computing unit 1001, the ROM 1002, and the RAM 1003 are connected to each other through a bus 1004. An input/output (I/O) interface 1005 is also connected to the bus 1004.

Multiple components in the electronic device 1000 are connected to the I/O interface 1005. The multiple components include an input unit 1006 such as a keyboard and a mouse, an output unit 1007 such as various types of display and speaker, the storage unit 1008 such as a magnetic disk and an optical disk, and a communication unit 1009 such as a network card, a modem, and a wireless communication transceiver. The communication unit 1009 allows the electronic device 1000 to exchange information/data with other devices over a computer network such as the Internet and/or over various telecommunication networks.

The computing unit 1001 may be various general-purpose and/or special-purpose processing components having processing and computing capabilities. Examples of the computing unit 1001 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller, and microcontroller. The computing unit 1001 performs the preceding methods and processing, such as a road network extraction method. For example, in some embodiments, the road network extraction method may be implemented as a computer software program tangibly included in a machine-readable medium such as the storage unit 1008. In some embodiments, part or all of a computer program may be loaded and/or installed on the electronic device 1000 via the ROM 1002 and/or the communication unit 1009. When the computer program is loaded onto the RAM 1003 and executed by the computing unit 1001, one or more steps of the preceding road network extraction method may be performed. Alternatively, in other embodiments, the computing unit 1001 may be configured, in any other suitable manner (for example, by means of firmware), to perform the road network extraction method.

Herein various implementations of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various implementations may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device, and at least one output device and transmitting data and instructions to the memory system, the at least one input device, and the at least one output device.

Program codes for implementation of the method of the present disclosure may be written in any combination of one or more programming languages. These program codes may be provided for the processor or controller of a general-purpose computer, a special-purpose computer, or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that may include or store a program available for an instruction execution system, apparatus, or device or a program used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Concrete examples of the machine-readable storage medium include an electrical connection based on one or more wires, a portable computer disk, a hard disk, a RAM, a ROM, an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), and the Internet.

A computer system may include clients and servers. A client and a server are generally remote from each other and typically interact through a communication network. The relationship between the client and the server arises by virtue of computer programs running on respective computers and having a client-server relationship to each other. The server may be a cloud server, a server of a distributed system, or a server combined with a blockchain.

Artificial intelligence is a discipline studying the simulation of certain human thinking processes and intelligent behaviors (such as learning, reasoning, thinking, and planning) by a computer and involves techniques at both hardware and software levels. Hardware techniques of artificial intelligence generally include techniques such as sensors, special-purpose artificial intelligence chips, cloud computing, distributed storage, and big data processing. Software techniques of artificial intelligence mainly include several major directions such as computer vision technology, speech recognition technology, natural language processing technology, machine learning/deep learning technology, big data processing technology, and knowledge graph technology.

Cloud computing refers to a technical system that accesses a shared elastic-and-scalable physical or virtual resource pool through a network and can deploy and manage resources in an on-demand self-service manner, where the resources may include servers, operating systems, networks, software, applications, storage devices, and the like. Cloud computing can provide efficient and powerful data processing capabilities for model training and technical applications such as artificial intelligence and blockchains.

It is to be understood that various forms of the preceding flows may be used, with steps reordered, added, or removed. For example, steps described in the present disclosure may be executed in parallel, in sequence, or in a different order as long as the desired results of the technical solutions disclosed in the present disclosure are achieved. The execution sequence of the steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present disclosure fall within the scope of the present disclosure.

What is claimed is:

1. A road network extraction method, comprising:
   extracting a first road network of a target region according to user trajectories of the target region;
   extracting a second road network of the target region according to a satellite aerial image of the target region; and
   extracting a target road network of the target region according to the first road network, the second road network, and the user trajectories;
   wherein extracting the second road network of the target region according to the satellite aerial image of the target region comprises:
   determining a feature map of the satellite aerial image of the target region;
   determining, according to the feature map, a first probability of an optional pixel in the satellite aerial image being a road keypoint; and
   extracting the second road network of the target region from the satellite aerial image according to the first probability;
   wherein extracting the second road network of the target region from the satellite aerial image according to the first probability comprises:
   selecting a target pixel from optional pixels according to the first probability;
   extracting a region of interest of the target pixel from the feature map;
   encoding the region of interest of the target pixel to obtain a local feature of the target pixel; and
   extracting the second road network of the target region from the satellite aerial image according to a global feature of the target pixel in the feature map and the local feature of the target pixel;

wherein extracting the second road network of the target region from the satellite aerial image according to the global feature of the target pixel in the feature map and the local feature of the target pixel comprises:
determining a fused feature of the target pixel according to the global feature of the target pixel in the feature map and the local feature of the target pixel;
encoding the fused feature of the target pixel to obtain a second probability of the target pixel being the road keypoint, a third probability of the target pixel belonging to a road, and map encoding information of the target pixel; and
extracting the second road network of the target region from the satellite aerial image according to the second probability of the target pixel being the road keypoint, the third probability of the target pixel belonging to the road, and the map encoding information of the target pixel.

2. The method of claim 1, wherein extracting the first road network of the target region according to the user trajectories of the target region comprises:
constructing a regional trajectory image according to the user trajectories of the target region;
determining a road network extraction strategy according to region heat of the target region; and
extracting the first road network of the target region from the regional trajectory image according to the road network extraction strategy.

3. The method of claim 2, wherein extracting the first road network of the target region from the regional trajectory image according to the road network extraction strategy comprises:
in a case where the region heat is greater than a set heat threshold, determining a trajectory density peak profile of a road in the regional trajectory image according to the user trajectories; and
extracting the first road network of the target region from the regional trajectory image according to the trajectory density peak profile.

4. The method of claim 2, wherein extracting the first road network of the target region from the regional trajectory image according to the road network extraction strategy comprises:
filtering the regional trajectory image in a filtering manner in the road network extraction strategy to obtain a filtered trajectory image; and
extracting the first road network of the target region from the filtered trajectory image according to a road network extraction manner in the road network extraction strategy.

5. The method of claim 1, wherein extracting the target road network of the target region according to the first road network, the second road network, and the user trajectories comprises:
performing an intersection operation on the first road network and the second road network to obtain a public road network;
constructing a regional trajectory image according to the user trajectories of the target region;
extracting a third road network of the target region according to the second road network, the public road network, and the regional trajectory image; and
adding the third road network to the public road network to obtain the target road network of the target region.

6. The method of claim 5, wherein performing the intersection operation on the first road network and the second road network to obtain the public road network comprises:
performing the intersection operation on the first road network and the second road network to obtain an intermediate road network; and
performing deduplication on the intermediate road network according to a road similarity to obtain the public road network.

7. The method of claim 5, wherein extracting the third road network of the target region according to the second road network, the public road network, and the regional trajectory image comprises:
determining another road network in the second road network except the public road network; and
extracting the third road network from the another road network according to the regional trajectory image.

8. The method of claim 1, further comprising:
determining a cumulative time length according to a total trajectory length in the target region; and
acquiring the user trajectories of the target region within the cumulative time length.

9. An electronic device, comprising:
at least one processor; and
a memory communicatively connected to the at least one processor;
wherein the memory stores an instruction executable by the at least one processor to enable the at least one processor to perform:
extracting a first road network of a target region according to user trajectories of the target region;
extracting a second road network of the target region according to a satellite aerial image of the target region; and
extracting a target road network of the target region according to the first road network, the second road network, and the user trajectories;
wherein the at least one processor extracts the second road network of the target region according to the satellite aerial image of the target region by:
determining a feature map of the satellite aerial image of the target region;
determining, according to the feature map, a first probability of an optional pixel in the satellite aerial image being a road keypoint; and extracting the second road network of the target region from the satellite aerial image according to the first probability;
wherein the at least one processor extracts the second road network of the target region from the satellite aerial image according to the first probability by:
selecting a target pixel from optional pixels according to the first probability;
extracting a region of interest of the target pixel from the feature map;
encoding the region of interest of the target pixel to obtain a local feature of the target pixel; and
extracting the second road network of the target region from the satellite aerial image according to a global feature of the target pixel in the feature map and the local feature of the target pixel; and
wherein the at least one processor extracts the second road network of the target region from the satellite aerial image according to the global feature of the target pixel in the feature map and the local feature of the target pixel by:
determining a fused feature of the target pixel according to the global feature of the target pixel in the feature map and the local feature of the target pixel;
encoding the fused feature of the target pixel to obtain a second probability of the target pixel being the road keypoint, a third probability of the target pixel belonging to a road, and map encoding information of the target pixel; and extracting the second road network of the target region from the satellite aerial image according to the second probability of the target pixel being the road keypoint, the third probability of the target pixel belonging to the road, and the map encoding information of the target pixel.

10. The electronic device of claim 9, wherein the at least one processor extracts the first road network of the target region according to the user trajectories of the target region by:

constructing a regional trajectory image according to the user trajectories of the target region;

determining a road network extraction strategy according to region heat of the target region; and extracting the first road network of the target region from the regional trajectory image according to the road network extraction strategy.

11. The electronic device of claim 10, wherein the at least one processor extracts the first road network of the target region from the regional trajectory image according to the road network extraction strategy by:

in a case where the region heat is greater than a set heat threshold, determining a trajectory density peak profile of a road in the regional trajectory image according to the user trajectories; and extracting the first road network of the target region from the regional trajectory image according to the trajectory density peak profile.

12. The electronic device of claim 10, wherein the at least one processor extracts the first road network of the target region from the regional trajectory image according to the road network extraction strategy by:

filtering the regional trajectory image in a filtering manner in the road network extraction strategy to obtain a filtered trajectory image; and extracting the first road network of the target region from the filtered trajectory image according to a road network extraction manner in the road network extraction strategy.

13. The electronic device of claim 9, wherein the at least one processor extracts the target road network of the target region according to the first road network, the second road network, and the user trajectories by:

performing an intersection operation on the first road network and the second road network to obtain a public road network;

constructing a regional trajectory image according to the user trajectories of the target region;

extracting a third road network of the target region according to the second road network, the public road network, and the regional trajectory image; and adding the third road network to the public road network to obtain the target road network of the target region.

14. A non-transitory computer-readable storage medium, which is configured to store a computer instruction for causing a computer to perform:

extracting a first road network of a target region according to user trajectories of the target region;

extracting a second road network of the target region according to a satellite aerial image of the target region; and extracting a target road network of the target region according to the first road network, the second road network, and the user trajectories;

wherein the computer extracts the second road network of the target region according to the satellite aerial image of the target region by:

determining a feature map of the satellite aerial image of the target region;

determining, according to the feature map, a first probability of an optional pixel in the satellite aerial image being a road keypoint; and extracting the second road network of the target region from the satellite aerial image according to the first probability;

wherein the computer extracts the second road network of the target region from the satellite aerial image according to the first probability by:

selecting a target pixel from optional pixels according to the first probability;

extracting a region of interest of the target pixel from the feature map;

encoding the region of interest of the target pixel to obtain a local feature of the target pixel; and extracting the second road network of the target region from the satellite aerial image according to a global feature of the target pixel in the feature map and the local feature of the target pixel; and wherein the computer extracts the second road network of the target region from the satellite aerial image according to the global feature of the target pixel in the feature map and the local feature of the target pixel by:

determining a fused feature of the target pixel according to the global feature of the target pixel in the feature map and the local feature of the target pixel;

encoding the fused feature of the target pixel to obtain a second probability of the target pixel being the road keypoint, a third probability of the target pixel belonging to a road, and map encoding information of the target pixel; and extracting the second road network of the target region from the satellite aerial image according to the second probability of the target pixel being the road keypoint, the third probability of the target pixel belonging to the road, and the map encoding information of the target pixel.

* * * * *